(12) United States Patent
Izumita et al.

(10) Patent No.: US 10,967,464 B2
(45) Date of Patent: Apr. 6, 2021

(54) SOLDER ALLOY, SOLDER PASTE, AND SOLDER JOINT

(71) Applicant: SENJU METAL INDUSTRY CO., LTD., Tokyo (JP)

(72) Inventors: Naoko Izumita, Tokyo (JP); Shunsaku Yoshikawa, Tokyo (JP); Yoshie Tachibana, Tokyo (JP)

(73) Assignee: SENJU METAL INDUSTRY CO., LTD., Tokyo (JP)

( * ) Notice: Subject to any disclaimer, the term of this patent is extended or adjusted under 35 U.S.C. 154(b) by 0 days.

(21) Appl. No.: 16/498,843

(22) PCT Filed: Mar. 30, 2018

(86) PCT No.: PCT/JP2018/013555
§ 371 (c)(1),
(2) Date: Sep. 27, 2019

(87) PCT Pub. No.: WO2018/181873
PCT Pub. Date: Oct. 4, 2018

(65) Prior Publication Data
US 2020/0114475 A1 Apr. 16, 2020

(30) Foreign Application Priority Data
Mar. 31, 2017 (JP) .............................. JP2017-073270

(51) Int. Cl.
*B23K 35/26* (2006.01)
*B23K 35/02* (2006.01)

(52) U.S. Cl.
CPC .......... *B23K 35/262* (2013.01); *B23K 35/025* (2013.01)

(58) Field of Classification Search
None
See application file for complete search history.

(56) References Cited

U.S. PATENT DOCUMENTS

| | | |
|---|---|---|
| 2015/0305167 A1 | 10/2015 | Nakanishi et al. |
| 2016/0056570 A1* | 2/2016 | Yoshikawa .............. H01R 4/02 174/257 |

(Continued)

FOREIGN PATENT DOCUMENTS

| | | |
|---|---|---|
| EP | 2868424 A1 | 5/2015 |
| EP | 2982469 A1 | 2/2016 |

(Continued)

OTHER PUBLICATIONS

Extended European Search Report dated Dec. 11, 2019 for the corresponding European Patent Application No. 18774478.4.

(Continued)

*Primary Examiner* — Keith D. Hendricks
*Assistant Examiner* — Joshua S Carpenter
(74) *Attorney, Agent, or Firm* — Leason Ellis LLP

(57) ABSTRACT

A solder alloy having an alloy composition consisting of, in mass %, Ag: 1% to 4%, Cu: 0.5% to 0.8%, Bi: more than 4.8% and 5.5% or less. Sb: more than 1.5% and 5.5% or less, Ni: 0.01% or more and less than 0.1%, Co: more than 0.001% and 0.1% or less, the balance being Sn. The alloy composition satisfies the following three relationships: $0.020\% \leq Ni+Co \leq 0.105\%$; $9.1\% \leq Sb+Bi \leq 10.4\%$; and $4.05 \times 10^{-3} \leq (Ni+Co)/(Bi+Sb) \leq 1.00 \times 10^{-2}$, where Ni, Co, Bi, and Sb each represent a content (mass %) thereof in the solder alloy.

3 Claims, 2 Drawing Sheets

(56) References Cited

U.S. PATENT DOCUMENTS

| | | |
|---|---|---|
| 2016/0279741 A1 | 9/2016 | Ukyo et al. |
| 2016/0368102 A1 | 12/2016 | Nishimura et al. |
| 2017/0355043 A1 | 12/2017 | Ikeda et al. |
| 2018/0029169 A1 | 2/2018 | Arai et al. |
| 2018/0214989 A1* | 8/2018 | Ikeda .................... B23K 35/22 |

FOREIGN PATENT DOCUMENTS

| | | |
|---|---|---|
| JP | 5349703 B1 | 8/2013 |
| JP | 2015-020182 A | 2/2015 |
| JP | 5723056 B1 | 4/2015 |
| JP | 2016-107343 A | 6/2016 |
| JP | 2016-120524 A | 7/2016 |
| JP | 2016-179498 A | 10/2016 |
| JP | 6047254 B1 | 11/2016 |
| JP | 6053248 B1 | 12/2016 |
| JP | 2018-083211 A | 5/2018 |
| WO | WO-2014/163167 A1 | 10/2014 |
| WO | WO-2015/166945 A1 | 11/2015 |
| WO | WO-2016/098358 A1 | 6/2016 |
| WO | WO-2016/179358 A1 | 11/2016 |
| WO | WO-2017/018167 A1 | 2/2017 |
| WO | WO-2017018167 A1 * | 2/2017 ............ B23K 35/26 |

OTHER PUBLICATIONS

Japanese Office Action dated Sep. 11, 2018 for the corresponding Japanese Patent Application No. 2018-538810.

Taiwanese Office Action dated Feb. 26, 2019 for the corresponding Taiwanese Patent Application No. 107111117.

International Search Report and Written Opinion dated Jun. 12, 2018 for the corresponding PCT International Patent Application No. PCT/JP2018/013555.

Chinese Office Action dated Nov. 4, 2020 for the corresponding Chinese Patent Application No. 201880018715.6.

* cited by examiner

- Electrode
- Intermetallic compound layer
- Fracture
- Solder alloy

- Electrode
- Fracture
- Intermetallic compound layer
- Solder alloy

SOLDER ALLOY, SOLDER PASTE, AND SOLDER JOINT

CROSS-REFERENCE TO RELATED PATENT APPLICATIONS

This application is a U.S. National Phase Application under 35 U.S.C. § 371 of International Patent Application No. PCT/JP2018/013555, filed Mar. 30, 2018, and claims the benefit of priority to Japanese Patent Application No. 2017-073270, filed on Mar. 31, 2017, all of which are incorporated herein by reference in their entirety. The International Application was published in Japanese on Mar. 28, 2019 as International Publication No. WO/2018/181873 under PCT Article 21(2).

FIELD OF THE INVENTION

The present invention relates to a solder alloy having high strength and providing excellent vibration resistance of a bonding portion, a solder paste, and a solder joint.

BACKGROUND OF THE INVENTION

In recent years, car electronics is advancing, and an automobile is transitioning from a gasoline vehicle to a hybrid vehicle or an electric automobile. In the hybrid vehicle or the electric automobile, an in-vehicle electronic circuit to which electronic components are soldered on a printed circuit board is mounted. Although the in-vehicle electronic circuit was disposed in a vehicle interior having an environment where a vibration is relatively small, the in-vehicle electronic circuit has been mounted directly in an engine room or an oil chamber of a transmission, and on a mechanical device, due to expansion of use.

As described above, the in-vehicle electronic circuit is mounted in a place which receives various external loads such as temperature difference, impact, and vibration due to expansion of a mounting region. For example, the in-vehicle electronic circuit mounted in the engine room may be exposed to a high temperature of 125° C. or higher during engine operation. On the other hand, when the engine is stopped, it is exposed to a low temperature of −40° C. or lower, e.g. in a cold place. When the in-vehicle electronic circuit is exposed to such temperature difference, stress concentrates on a bonding portion due to a difference in a coefficient of thermal expansion between the electronic component and the printed circuit board. Therefore, when a Sn—3Ag—0.5Cu solder alloy in the related art is used, the bonding portion may be fractured, and a solder alloy that can prevent fracture of the bonding portion is studied even in an environment where temperature difference is severe.

For example, Japanese Patent No. 5349703, Japanese Patent No. 5723056, Japanese Patent No. 6047254, WO 2014/163167 A1 and Japanese Patent No. 6053248 disclose a Sn—Ag—Cu—Bi—Sb—Ni—Co based solder alloy. In the invention described in Japanese Patent No. 5349703, presence or absence of a void, Cu leaching, and a solder life by means of a heat cycle test are evaluated in the case of an alloy composition in which the Sb content is 1.5% or less or 3.0% or more, and the Bi content is 2.7% or less. In the invention described in Japanese Patent No. 5723056, impact resistance before and after the heat cycle test is evaluated in the case of the alloy composition in which the Ni content is 0.1% or more or 0.04%, and the Bi content is 3.2%. In the invention described in Japanese Patent No. 6047254, presence or absence of a crack or void on a solder joint after the heat cycle is evaluated in the case of the alloy composition in which the Bi content is 3.2% or less or 3.5%, and the Co content is 0.001%. In the invention described in WO 2014/163167 A1, a crack incidence in a solder joint after the heat cycle is evaluated in the case of the alloy composition in which the Bi content is 3.2% or less. In the invention described in Japanese Patent No. 6053248, presence or absence of a crack on a fillet portion after the heat cycle is evaluated in the case of the alloy composition in which the Bi content is 4.8% or less.

TECHNICAL PROBLEM

As described above, in the inventions described in Japanese Patent No. 5349703, Japanese Patent No. 5723056, Japanese Patent No. 6047254, WO 2014/163167 A1 and Japanese Patent No. 6053248, a solder alloy for an in-vehicle electronic circuit exposed to an environment in which temperature difference is large, for example, an engine room, is mainly evaluated. However, in addition to heat cycle characteristics, as a mounting region of the in-vehicle electronic circuit expands, it becomes necessary to improve impact resistance and vibration resistance, and a study focused on these characteristics is also necessary. In the above literatures, impact resistance is evaluated in the invention described in Japanese Patent No. 5723056, but only an evaluation of dropping impact by dropping 5 times from a height of 1 m is described as an evaluation method thereof.

Here, since a suspension is mounted on the automobile, it is difficult to assume a situation in which an impact of dropping from 1 m is applied to the automobile only when the automobile travels on a paved road or a gravel road. Therefore, it is thought that evaluation of the dropping impact described in Japanese Patent No. 5723056 assumes a case where the automobile collides. In this case, when the dropping impact is evaluated, at least dropping of a circuit board from a surface thereof, dropping of the circuit board from a corner thereof, and the like must be prescribed, and a material of a floor surface on which the circuit board falls must also be prescribed. However, in Japanese Patent No. 5723056, as described above, only a height of dropping and times of dropping are prescribed, it must be said that the evaluation itself is ambiguous, and it is unclear what kind of collision is assumed. Even in the alloy composition evaluated to be no problem in the above evaluation, problems may occur depending on dropping of the circuit board from a surface thereof, dropping of the circuit board from a corner thereof, and the like, or the material of the floor surface on which the circuit board falls. Therefore, it is necessary to design an alloy under evaluation criteria determined to at least a certain degree.

In addition, in vibration transmitted to a vehicle body during normal traveling, a load applied by one impact is smaller and times of applying the load are more, as compared with the case of an impact at the time of collision. Therefore, it is necessary to improve the alloy composition disclosed in the Japanese Patent No. 5349703, Japanese Patent No. 5723056, Japanese Patent No. 6047254, WO 2014/163167 A1 and Japanese Patent No. 6053248while evaluating vibration resistance under evaluation conditions close to actual conditions.

Further, in Japanese Patent No. 5349703, Japanese Patent No. 5723056, Japanese Patent No. 6047254, WO 2014/163167 A1 and Japanese Patent No. 6053248, as described above, an alloy design mainly focused on heat cycle characteristics has been made. In the in-vehicle electronic circuit exposed to the heat cycle, a stress is applied to a bonding portion due to a difference in a coefficient of thermal expansion between a printed circuit board and an electronic component. On the other hand, when vibration is applied to the in-vehicle electronic circuit, the stress is considered to be a stress close to an external impact, unlike a stress caused by expansion and contraction of the printed circuit board or the electronic component generated during the heat cycle. That is, since different behavior of a load on the bonding portion is seen between a heat cycle test and a vibration test, an alloy design suitable for corresponding to expansion of the mounting region of the circuit board is required.

In addition to this, in order to prevent a fracture in the bonding portion of the in-vehicle electronic circuit regardless of the mounting region of the in-vehicle electronic circuit, it is also necessary to improve strength of the solder alloy itself forming the bonding portion. From also this viewpoint, it is necessary to study the known alloy composition again.

An object of the present invention is to provide a solder alloy, a solder paste, and a solder joint having high reliability since the solder alloy has high tensile strength and provides the bonding portion excellent in vibration resistance between the printed circuit board and the electronic component.

SUMMARY OF THE INVENTION

Solution to Problem

The present inventors first assumed a case in which a load due to vibration is applied to a bonding portion as described above, and then investigated a fracture mode of the bonding portion bonded by the Sn—3Ag—0.5Cu solder alloy in the related art. It was found that, in the case of using the solder alloy, the fracture occurred at an interface between an electrode and the solder alloy.

Therefore, in order to avoid such a fracture mode, the present inventors focused on a Ni content and a Co content in the Sn—Ag—Cu—Bi—Sb—Ni—Co based solder alloy and investigated the contents of elements thereof in detail. As a result, the fracture mode was not found within a predetermined range of these, but transition to the fracture mode was found in the solder alloy in the vicinity of an intermetallic compound layer. That is, it was found that in an alloy composition in which the Ni content and the Co content were adjusted, vibration resistance was improved by transition of the fracture mode.

In addition, in order to prevent extension of cracks in the solder alloy, the present inventors focused on the fact that it is necessary to improve strength of the solder alloy itself. Here, Japanese Patent No. 5349703, Japanese Patent No. 5723056, Japanese Patent No. 6047254, WO 2014/163167 A1 and Japanese Patent No. 6053248 disclose only an alloy composition in which the Sb content and the Bi content are reduced low in Examples using a Sn—Ag—Cu—Bi—Sb—Ni—Co based solder alloy. However, in recent years, since the mounting region of the in-vehicle electronic circuit is enlarged, tensile strength of the solder alloy higher than that in the related art has been required.

Therefore, the present inventors finely adjusted the Ni content and the Co content in a composition in which Ag and Cu are contained in predetermined amounts, and then designed the alloy by increasing a Sb content and a Bi content to improve strength of the solder alloy itself. As a result, it was found that the tensile strength of the solder alloy was improved while the cracks in the solder alloy in the vicinity of the intermetallic compound layer were prevented and the vibration resistance was improved.

According to the above studies, the present inventors studied further to improve reliability, though a solder alloy that can sufficiently respond to expansion of the mounting region of the circuit board was obtained. It is assumed that, by only increasing the content of Sb and Bi to merely improve the tensile strength, the contents of Ni and Co are relatively reduced, and thus, the vibration resistance would not be improved. Therefore, as a result of further detailed investigation considering balance between the tensile strength and the vibration resistance, it was found that the tensile strength and vibration resistance of the solder alloy were improved and higher reliability was obtained by adjusting the contents of Ni and Co that prevent fracture at an interface between an electrode of the printed circuit board and the solder alloy, the contents of Bi and Sb that prevent crack extension in the solder alloy, and the balance thereof.

The present invention obtained by these findings is as follows.

(1) A solder alloy having an alloy composition consisting of, in mass %:
Ag: 1% to 4%;
Cu: 0.5% to 0.8%;
Bi: more than 4.8% and 5.5% or less;
Sb: more than 1.5% and 5.5% or less;
Ni: 0.01% or more and less than 0.1%;
Co: more than 0.001% and 0.1% or less; and the balance being Sn.

(2) The solder alloy according to the above (1), wherein the alloy composition satisfies the following relationships (1) to (3):

$$0.020\% \leq Ni+Co \leq 0.105\% \quad (1)$$

$$9.1\% \leq Sb+Bi \leq 10.4\% \quad (2)$$

$$4.05 \times 10^{-3} \leq (Ni+Co)/(Bi+Sb) \leq 1.00 \times 10^{-2} \quad (3),$$

wherein Ni, Co, Bi, and Sb each represent a content (mass %) thereof in the solder alloy.

(3) A solder paste containing the solder alloy according to the above (1) or (2).

(4) A solder joint containing the solder alloy according to the above (1) or (2).

BRIEF DESCRIPTION OF THE DRAWINGS

FIG. 1A is a cross-sectional SEM photograph of a solder joint formed by the alloy composition of Example 1, and FIG. 1B is a cross-sectional SEM photograph of a solder joint formed by the alloy composition of Comparative Example 6.

DETAILED DESCRIPTION OF THE INVENTION

Figure 1A:
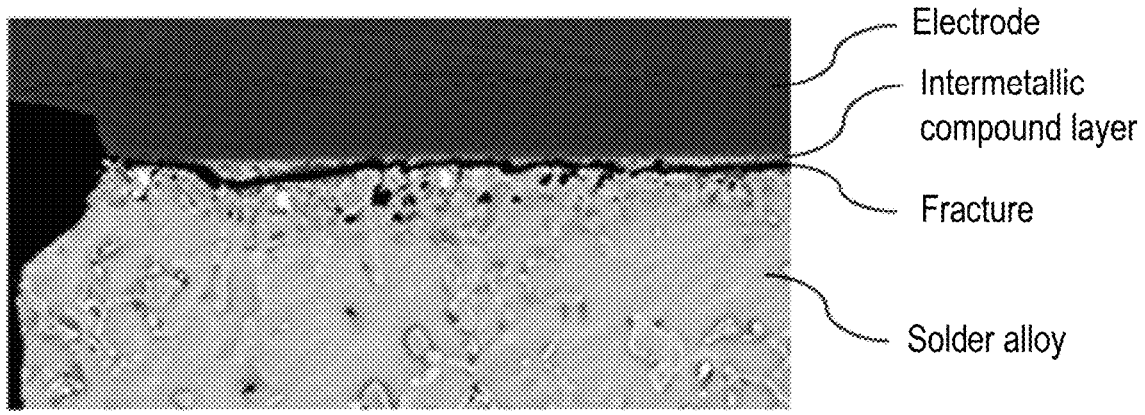
FIG. 1A and FIG. 1B show cross-sectional SEM photographs of a solder joint.

The present invention is described in more detail below. In the present description, "%" regarding a solder alloy composition is "mass %" unless particularly specified.

1. Solder alloy (1) Ag: 1% to 4%

Ag improves wettability of solder and precipitates a network-shaped compound of an intermetallic compound of $Ag_3Sn$ in a solder matrix to form a precipitation strengthening alloy and improve tensile strength of the solder alloy. When an Ag content is less than 1%, the wettability of solder is not improved. As the lower limit of the Ag content, the content is preferably 2.0% or more, and more preferably 3.3% or more.

On the other hand, when the Ag content exceeds 4%, vibration resistance is inferior because of a coarse $Ag_3Sn$ intermetallic compound which crystallizes as an initial crystal, and a liquidus temperature also rises. As the upper limit of the Ag content, the content is preferably 3.7% or less, and more preferably 3.5% or less.

(2) Cu: 0.5% to 0.8%

Cu improves the tensile strength of the solder alloy. When a Cu content is less than 0.5%, the tensile strength is not improved. As the lower limit of Cu, the content is preferably 0.6% or more, and more preferably 0.65% or more.

On the other hand, when the Cu content exceeds 0.8%, vibration resistance is inferior because of a coarse $Cu_6Sn_5$ intermetallic compound which crystallizes as an initial crystal, and a liquidus temperature also rises. As the upper limit of Cu, the content is preferably 0.75% or less.

(3) Bi: more than 4.8% and 5.5% or less

Bi is an element necessary for improving the vibration resistance by improving the tensile strength of the solder alloy. In addition, even if Bi is contained, formation of a fine SnSb intermetallic compound to be described later is not prevented, and the precipitation strengthening solder alloy is maintained. When a Bi content is 4.8% or less, the above effect cannot be sufficiently exhibited. As the lower limit of the Bi content, the content is preferably 4.9% or more.

On the other hand, when the Bi content exceeds 5.5%, ductility of the solder alloy decreases and the solder alloy becomes hard, and the vibration resistance deteriorates. As the upper limit of the Bi content, the content is preferably 5.3% or less, and more preferably 5.2% or less.

(4) Sb: more than 1.5% and 5.5% or less Sb is a solid-solution strengthening element which penetrates into a Sn matrix, is a precipitation dispersion strengthening element which forms a fine SnSb intermetallic compound by an amount exceeding a solubility limit to Sn, and is an element necessary for improving the vibration resistance by improving the tensile strength of the solder alloy. When a Sb content is 1.5% or less, precipitation of the SnSb intermetallic compound is insufficient, and the effect cannot be exhibited. As the lower limit of the Sb content, the content is preferably 1.6% or more, more preferably 3.0% or more, and still more preferably 4.8% or more.

On the other hand, when the Sb content exceeds 5.5%, the solder alloy may become hard, and the vibration resistance may deteriorate. As the upper limit of the Sb content, the content is preferably 5.3% or less, and more preferably 5.2% or less.

(5) Ni: 0.01% or more and less than 0.1%

Ni is uniformly dispersed in an intermetallic compound which precipitates near a bonding interface between an electrode and the solder alloy, reforms an intermetallic compound layer, and prevents fracture at the bonding interface between the electrode and the solder alloy. As a result, the fracture mode transitions to a fracture mode in the solder alloy in the vicinity of the intermetallic compound layer. When a Ni content is less than 0.01%, the above effect cannot be exhibited. As the lower limit of the Ni content, the content is preferably 0.02% or more, and more preferably 0.03% or more.

On the other hand, when the Ni content is 0.1% or more, a melting point of the solder alloy becomes high, and temperature setting during solder bonding must be changed. As the upper limit of the Ni content, the content is preferably 0.09% or less, and more preferably 0.05% or less.

(6) Co: more than 0.001% and 0.1% or less

Co is an element necessary for improving the effect of Ni. When a Co content is 0.001% or less, the above effect cannot be exhibited. As the lower limit of the Co content, the content is preferably 0.002% or more, and more preferably 0.004% or more.

On the other hand, when the Co content is more than 0.1%, a melting point of the solder alloy becomes high, and temperature setting during solder bonding must be changed. As the upper limit of the Co content, the content is preferably 0.05% or less, and more preferably 0.012% or less.

(7) $0.020\% \leq Ni+Co \leq 0.105\%$ (1)

In the solder alloy of the present invention, it is necessary to prevent fracture at a bonding interface with the electrode, which is not a preferable embodiment as the fracture mode of the solder joint. Since this effect is sufficiently exhibited, as the lower limit of a total amount of Ni and Co, the total amount is preferably 0.020% or more, and more preferably 0.042% or more.

As the upper limit thereof, the total amount is preferably 0.105% or less, more preferably 0.098% or less, still more preferably 0.09% or less, and particularly preferably 0.050% or less in order that a solder joint can be formed under reflow conditions in the related art by preventing a rise of the melting point.

In the relationship (1), Ni and Co each represent a content (mass %) thereof in the solder alloy.

(8) $9.1\% \leq Sb+Bi \leq 10.4\%$ (2)

In the solder alloy of the present invention, by increasing a total amount of Sb and Bi, crack extension in the solder alloy is prevented, the tensile strength of the solder alloy is improved, and the vibration resistance is further improved. In order to sufficiently exhibit this effect, as the lower limit of the total amount of Sb and Bi, the total amount is preferably 9.1% or more, more preferably 9.6% or more, still more preferably 9.7% or more, and particularly preferably more than 9.8%.

As the upper limit thereof, the total amount is preferably 10.4% or less, and more preferably 10.0% or less from the viewpoint of preventing the crack extension in the solder alloy without excessively hardening the solder alloy.

In the relationship (2), Bi and Sb each represent a content (mass %) thereof in the solder alloy.

(9) $4.05 \times 10^{-3} \leq (Ni+Co)/(Bi+Sb) \leq 1.00 \times 10^{-2}$ (3)

In the solder alloy of the present invention, balance between the tensile strength and the vibration resistance is preferably maintained from the viewpoint of further sufficiently responding to expansion of the mounting region of the circuit board. When the contents of Bi and Sb do not increase too much, the contents of Ni and Co do not relatively decrease with respect to the contents of Bi and Sb, and the tensile strength of the solder alloy is not too high. Correspondingly, when the contents of Ni and Co are an appropriate amount, fracture at the interface between the electrode and the solder alloy is prevented, rise of the melting point of the solder alloy is prevented, soldering can be performed without a problem, and deterioration of the vibration resistance is prevented. As described above, it is considered that higher reliability can be obtained by preventing the rise of the melting point of the solder alloy, and adjusting the balance between the total content of Ni and Co that prevent fracture at an interface between the printed circuit board and the solder alloy and the total content of Bi and Sb that prevent the crack extension in the solder alloy by improving the tensile strength.

For this reason, it is desirable that in addition to the relationships (1) and (2), the relationship (3) is satisfied.

In order to exhibit an effect obtained by satisfying the relationship (3), as the lower limit of the relationship (3), it is preferably $4.05 \times 10^{-3}$ or more, and more preferably $4.20 \times 10^{-3}$ or more. As the upper limit of the relationship (3), it is preferably $1.00 \times 10^{-2}$ or less, more preferably $9.8 \times 10^{-3}$ or less, particularly preferably $9.0 \times 10^{-3}$ or less, and most preferably $5.5 \times 10^{-3}$ or less.

In the relationship (3), Ni, Co, Bi, and Sb each represent a content (mass %) thereof in the solder alloy.

(10) Balance: Sn

The balance of the solder alloy in the present invention is Sn and may contain inevitable impurities in addition to the above elements. Even when the inevitable impurities are contained, the effect described above is not affected.

2. Solder paste

A solder paste of the present invention is a mixture of a solder powder containing the above alloy composition and a flux. The flux used in the present invention is not particularly limited if soldering can be performed by a usual method. Therefore, a flux in which a rosin, an organic acid, an active agent, and a solvent, which are generally used, are appropriately blended may be used. In the present invention, a blending ratio between a metal powder component and a flux component is not particularly limited but is preferably the metal powder component: 80 to 90 mass % and the flux component: 10 to 20 mass %.

3. Solder joint

A solder joint in the present invention is suitable for use in connection between an IC chip and a circuit board thereof (interposer) in a semiconductor package, or connection between a semiconductor package and a printed circuit board. Here, the "solder joint" refers to a bonding portion with an electrode.

4. Others

A method for manufacturing the solder alloy in the present invention may be performed in accordance with a usual method.

A bonding method using the solder alloy in the present invention may be carried out in accordance with a usual method using, e.g. a reflow method. In addition, in bonding using the solder alloy in the present invention, a structure can be further refined in consideration of a cooling rate during solidification. For example, the solder joint is cooled at a cooling rate of 2 to 3° C./s or more. Other bonding conditions can be appropriately adjusted depending on the alloy composition of the solder alloy.

Further, a shape of lead-free solder in the present invention may be used as not only the solder paste, but also solder preform having a shape such as a ball shape, a pellet, or a washer, or wire solder and resin flux-cored solder.

A low α-ray alloy can be manufactured by using a low α-ray wire rod as a raw material of the solder alloy in the present invention. Such a low α-ray alloy can prevent a soft error when the alloy is used to form a solder bump around a memory.

EXAMPLES

A printed circuit board and an electronic component were bonded by using a solder alloy having an alloy composition shown in Table 1, and vibration resistance was evaluated. Tensile strength of the solder alloy having the alloy composition shown in Table 1 was evaluated. Each evaluation method is described below.

1. Vibration resistance (1) Production of solder paste

Solder alloy powder having an average particle diameter of 20 μm and having the solder alloy composition described in Table 1 was mixed with a common pasty rosin-based flux, thereby producing a solder paste. A flux content was adjusted to 12 mass % with respect to a mass of the entire solder paste.

(2) Formation of solder joint

The solder paste was printed on the following circuit board using the following metal mask, three LGAs described below were mounted on a printed circuit board. Thereafter, soldering was performed under the following reflow conditions, thereby forming a solder joint.

LGA

Package outer diameter: 12.90 mm×12.90 mm
Surface treatment: electrolyte Ni/Au
Total electrode number: 345 pins
Electrode pitch (between electrode centers): 0.5 mm pitch
Solder resist opening portion: φ0.23 mm
Electrolyte Ni/Au land diameter: φ0.25 mm
Circuit board
Mounting circuit board: 132 mm×77 mm
Circuit board surface treatment: Cu—OSP
Used substrate: FR-4
Layer structure: double-side circuit board
Coefficient of thermal expansion: Circuit board thickness: 1.0 mm
Solder resist opening portion: φ0.40 mm
Electrolyte Ni/Au land diameter: φ0.28 mm
Metal mask
Mask thickness: 120 μm
Opening diameter: φ0.28 mm
Reflow conditions
Preheating temperature: 130° C. to 170° C.
Preheating time: 100 seconds
Temperature rise rate from preheating temperature to melting temperature: 1.6° C./second
Melting time (temperature of 220° C. or higher): 35 seconds
Peak temperature: 243° C.
Cooling rate from peak temperature to 150° C.: 2.4° C./second (3) Vibration test A vibration test apparatus manufactured by Emic Corporation having the following configuration was used in the vibration test.

Low temperature thermostatic bath: VC-082BAFX (32) P3T
CUBE type jig (200 mm×200 mm): JSA-150-085
Acceleration pickup attached to CUBE type jig: 731-B type
Precharge amplifier: 504-E-2
Acceleration pickup attached to circuit board: 710-D type The circuit board on which an LGA was mounted was fixed to an upper surface of the CUBE type jig, and the acceleration pickup (710-D type) was attached to the fixed circuit board.

The vibration test apparatus used the precharge amplifier to measure a signal from the acceleration pickup of the circuit board and controlled the signal from the acceleration pickup of the CUBE type jig to indicate a predetermined value. By this control, desired acceleration and resonance frequency can be obtained.

In the examples, the circuit board was vibrated at acceleration of 223 G (resonance frequency: 166.32 Hz) by vibrating the CUBE type jig at acceleration of 20 G (resonance frequency: 166.32 Hz). The number of vibration cycles when a resistance value of each LGA rose 20% from an initial value was measured. In the examples, when the number of vibration cycles was 300,000 or more, it was determined to be a level without a practical problem.

2. Tensile strength

The tensile strength was measured in accordance with JISZ 3198-2. Each solder alloy described in Table 1 was cast into a mold, and a test piece having a gauge length of 30 mm and a diameter of 8 mm was produced. The produced test piece was pulled at a stroke of 6 mm/min at room temperature by Type 5966 manufactured by Instron, and strength when the test piece was fractured was measured. In the examples, when the tensile strength was 80 MPa or more and 120 MPa or less, it was determined to be a level without a practical problem. The results are shown in Table 1.

To clarify the effect of the present invention from the results in Table 1, the present invention is further described below using FIG. 1A, FIG. 1B and FIG. 2.

Figure 1B:
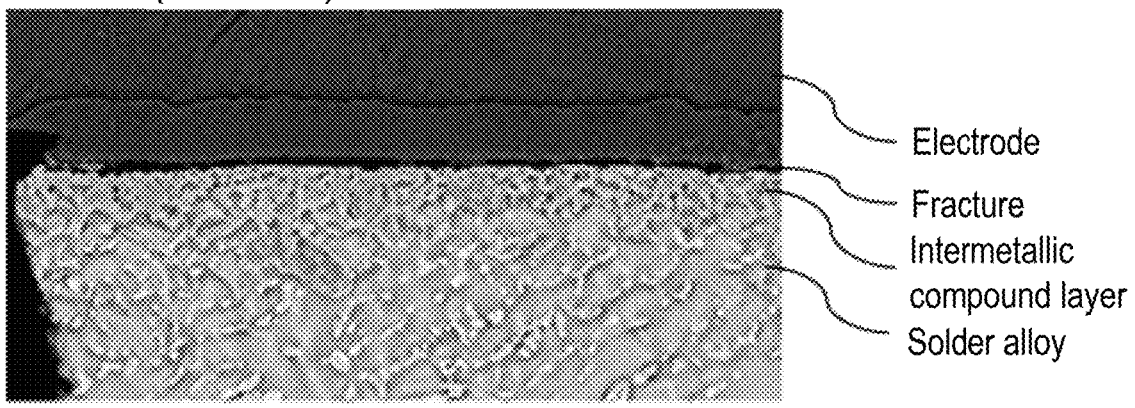

FIG. 1A and FIG. 1B show cross-sectional SEM photographs of a solder joint, and FIG. 1A is a cross-sectional SEM photograph of a solder joint formed by the alloy composition of Example 1, and FIG. 1B is a cross-sectional SEM photograph of a solder joint formed by the alloy composition of Comparative Example 6. In FIG. 1A, the vibration test was continued until the cross section was fractured, and then an SEM photograph of the cross section was taken. It is found that in Example 1 in which the predetermined amounts of Ni and Co were contained, fracture occurred in the solder alloy in the vicinity of the intermetallic compound layer. On the contrary, in Comparative Example 6 in which Ni and Co were not contained,

TABLE 1

| | Solder composition (mass %) | | | | | | | Sb + Bi | Ni + Co | (Ni + Co)/ (Sb + Bi) | Number of vibration cycles (cycle) | Tensile strength (@RT) (MPa) | Number of vibration cycles × Tensile strength (MPa * cycle) |
|---|---|---|---|---|---|---|---|---|---|---|---|---|---|
| | Sn | Ag | Cu | Sb | Bi | Ni | Co | | | | | | |
| Example 1 | Balance | 3.4 | 0.7 | 5.0 | 5.0 | 0.04 | 0.008 | 10.0 | 0.048 | 4.800E−03 | 1.2E+06 | 107 | 1.31E+08 |
| Example 2 | Balance | 3.4 | 0.5 | 5.0 | 5.0 | 0.04 | 0.008 | 10.0 | 0.048 | 4.800E−03 | 1.2E+06 | 103 | 1.22E+08 |
| Example 3 | Balance | 3.4 | 0.7 | 1.6 | 5.0 | 0.04 | 0.008 | 6.6 | 0.048 | 7.273E−03 | 1.0E+06 | 93 | 9.62E+07 |
| Example 4 | Balance | 3.4 | 0.7 | 5.5 | 5.0 | 0.04 | 0.008 | 10.5 | 0.048 | 4.571E−03 | 9.2E+05 | 108 | 9.97E+07 |
| Example 5 | Balance | 3.4 | 0.7 | 5.0 | 4.9 | 0.04 | 0.008 | 9.9 | 0.048 | 4.848E−03 | 1.2E+06 | 103 | 1.26E+08 |
| Example 6 | Balance | 3.4 | 0.7 | 5.0 | 5.5 | 0.04 | 0.008 | 10.5 | 0.048 | 4.571E−03 | 3.7E+05 | 109 | 4.04E+07 |
| Example 7 | Balance | 3.4 | 0.7 | 5.0 | 5.0 | 0.01 | 0.008 | 10.0 | 0.018 | 1.800E−03 | 6.5E+05 | 114 | 7.36E+07 |
| Example 8 | Balance | 3.4 | 0.7 | 5.0 | 5.0 | 0.09 | 0.008 | 10.0 | 0.098 | 9.800E−03 | 3.8E+05 | 107 | 4.12E+07 |
| Example 9 | Balance | 3.4 | 0.7 | 5.0 | 5.0 | 0.04 | 0.002 | 10.0 | 0.042 | 4.200E−03 | 1.2E+06 | 107 | 1.25E+08 |
| Example 10 | Balance | 3.4 | 0.7 | 5.0 | 5.0 | 0.04 | 0.05 | 10.0 | 0.09 | 9.000E−03 | 7.2E+05 | 112 | 8.07E+07 |
| Comparative Example 1 | Balance | 3.5 | 0.7 | 5.0 | 5.0 | 0.1 | 0.005 | 10.0 | 0.105 | 1.050E−02 | 8.7E+04 | 107 | 9.29E+06 |
| Comparative Example 2 | Balance | 3.4 | 0.7 | 2.0 | 1.5 | 0.04 | 0.008 | 3.5 | 0.048 | 1.371E−02 | 2.9E+05 | 78 | 2.24E+07 |
| Comparative Example 3 | Balance | 3.4 | 0.7 | 5.0 | 5.0 | 0 | 0.008 | 10.0 | 0.008 | 8.000E−04 | 1.6E+05 | 115 | 1.79E+07 |
| Comparative Example 4 | Balance | 3.4 | 0.7 | 5.0 | 5.0 | 0.04 | 0 | 10.0 | 0.040 | 4.000E−03 | 2.3E+05 | 106 | 2.50E+07 |
| Comparative Example 5 | Balance | 3.4 | 0.7 | 7.0 | 7.0 | 0.04 | 0.008 | 14.0 | 0.048 | 3.429E−03 | 3.7E+04 | 123 | 4.54E+06 |
| Comparative Example 6 | Balance | 3.0 | 0.5 | 0 | 0 | 0 | 0 | 0.0 | 0.000 | — | 7.5E+03 | 53 | 3.97E+05 |

The underline value represents the case falling outside the range of the present invention.

As shown in Table 1, in Example 1, the tensile strength was more than 80 MPa, and the number of vibration cycles was also more than 300,000.

On the other hand, in Comparative Example 1, since the Ni content was high and the melting point rose, solder bonding was insufficient and the number of vibration cycles was inferior under the above reflow conditions. In Comparative Example 2, the Bi content was low, and the tensile strength and the number of vibration cycles were inferior.

In Comparative Example 3, fracture occurred at the interface between the solder alloy and the electrode since Ni was not contained, and the number of vibration cycles was inferior. In Comparative Example 4, fracture occurred at the interface between the solder alloy and the electrode since Co was not contained, and the number of vibration cycles was inferior. In Comparative Example 5, the Sb and Bi contents were high and high tensile strength was exhibited, and the number of vibration cycles was inferior. In Comparative Example 6, fracture occurred at the interface between the solder alloy and the electrode since Ni and Co were not contained, and the number of vibration cycles was inferior. In addition, since Sb and Bi were not contained, the tensile strength of the solder alloy was also inferior.

fracture occurred at the interface between the electrode and the solder alloy. In this manner, it was found that the fracture mode was transitioned by containing the predetermined amounts of Ni and Co.

Figure 2:
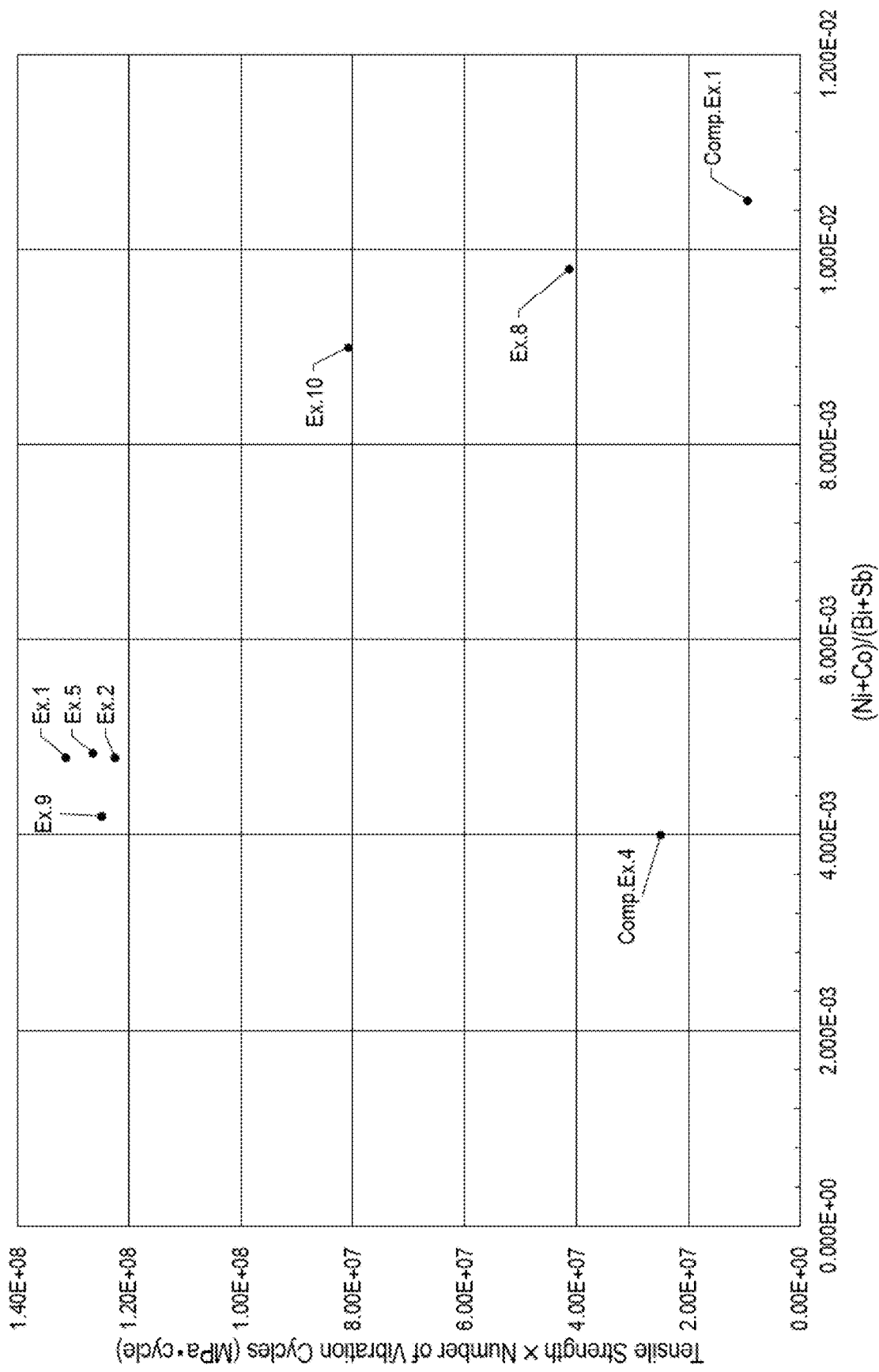
FIG. 2 is a graph showing a relation between the relationship (3) and "TS×number of vibration cycles".

FIG. 2 is a graph showing a relation between the relationship (3) and "tensile strength×number of vibration cycles". In FIG. 2, the alloy compositions satisfying the relationships (1) and (2) were extracted from Table 1. From FIG. 2, it was found in Examples that the "tensile strength x number of vibration cycles" showed a value of $4.0 \times 10^7$ or more within the range of the relationship (3), so that balance between the tensile strength and the number of vibration cycles was good, and excellent reliability was shown. Particularly, in Examples 1, 2, 5, and 9 that satisfy the relationships (1) to (3), it was found that the "tensile strength× number of vibration cycles" showed a value of $1.2 \times 10^8$ or more, so that the balance between the excellent tensile strength and the number of vibration cycles was achieved, and high reliability was achieved.

From the above, since the solder alloy in the present invention has high tensile strength and excellent vibration resistance, the solder alloy may be suitably used for a circuit used in a place where vibration is transmitted, for example, an in-vehicle electronic circuit.

The invention claimed is:

1. A solder alloy having an alloy composition consisting of, in mass %:
Ag: 1% to 4%;
Cu: 0.5% to 0.8%;
Bi: 4.9% or more and 5.5% or less;
Sb: more than 1.5% and 5.5% or less;
Ni: 0.01% or more and less than 0.1%;
Co: more than 0.001% and 0.1% or less; and
the balance being Sn,
wherein the alloy composition satisfies the following relationships (1) to (3):

$$0.020\% \leq Ni+Co \leq 0.105\% \quad (1)$$

$$9.1\% \leq Sb+Bi \leq 10.4\% \quad (2)$$

$$4.05 \times 10^{-3} \leq (Ni+Co)/(Bi+Sb) \leq 1.00 \times 10^{-2} \quad (3), \text{ and}$$

wherein Ni, Co, Bi, and Sb each represent a content (mass %) thereof in the solder alloy.

2. A solder paste comprising the solder alloy according to claim 1.

3. A solder joint comprising the solder alloy according to claim 1.

* * * * *